(12) United States Patent
Xu

(10) Patent No.: US 11,828,299 B2
(45) Date of Patent: Nov. 28, 2023

(54) CEILING FAN MODULE WITH ENERGY DISSIPATION FUNCTION AND CONFIGURATION METHOD THEREOF

(71) Applicant: INSPUR SUZHOU INTELLIGENT TECHNOLOGY CO., LTD., Jiangsu (CN)

(72) Inventor: Zhijie Xu, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 14 days.

(21) Appl. No.: 17/907,997

(22) PCT Filed: Jan. 12, 2021

(86) PCT No.: PCT/CN2021/071243
§ 371 (c)(1),
(2) Date: Aug. 30, 2022

(87) PCT Pub. No.: WO2022/007383
PCT Pub. Date: Jan. 13, 2022

(65) Prior Publication Data
US 2023/0095337 A1    Mar. 30, 2023

(30) Foreign Application Priority Data

Jul. 8, 2020   (CN) .......................... 202010653101.4

(51) Int. Cl.
*F04D 29/66* (2006.01)
*F04D 29/60* (2006.01)

(52) U.S. Cl.
CPC ......... *F04D 29/668* (2013.01); *F04D 29/601* (2013.01)

(58) Field of Classification Search
CPC .............................. F04D 29/668; F04D 29/601
See application file for complete search history.

(56) References Cited

U.S. PATENT DOCUMENTS 9,739,291 B2    8/2017  Masuo
2011/0158791 A1*  6/2011  Li ............................ G06F 1/20
                                                              415/119
(Continued)

FOREIGN PATENT DOCUMENTS

CN         2809297 Y        8/2006
CN       201241878 Y  *     5/2009
(Continued)

OTHER PUBLICATIONS

International Search Report of corresponding PCT application PCT/CN2021/071243, dated Mar. 18, 2021, 8 pages.
(Continued)

*Primary Examiner* — Sabbir Hasan
(74) *Attorney, Agent, or Firm* — COOPER LEGAL GROUP, LLC

(57) ABSTRACT

A ceiling fan module with an energy dissipation function and a configuration method thereof are disclosed. The ceiling fan module includes a fan rack, a fan and an energy dissipation assembly. The energy dissipation assembly passes through the fan rack and the fan and connects the fan rack and the fan; the energy dissipation assembly includes steel cables (3), high-damping vibration attenuation rings, fasteners and balancing weights; two high-damping vibration attenuation rings are sleeved on one steel cable, and the two high-damping vibration attenuation rings are respectively located at two ends of the steel cable; the high-damping vibration attenuation rings are mounted on the fan rack and the fan and separate the fan rack from the fan; the fasteners are mounted on the steel cables and are located on outer sides of the high-damping vibration attenuation rings and the fan rack.

20 Claims, 4 Drawing Sheets

(56) References Cited

U.S. PATENT DOCUMENTS

2012/0195738 A1* 8/2012 Chan .................. F04D 25/0613
                                                                    415/119
2013/0045109 A1   2/2013 Lee
2018/0080479 A1   3/2018 Yang et al.

FOREIGN PATENT DOCUMENTS

| | | |
|---|---|---|
| CN | 201241878 Y | 5/2009 |
| CN | 101784817 A | 7/2010 |
| CN | 201560968 U | 8/2010 |
| CN | 201600637 U | 10/2010 |
| CN | 102625636 A | 8/2012 |
| CN | 102955498 A | 3/2013 |
| CN | 103835959 A | 6/2014 |
| CN | 104564845 A | 4/2015 |
| CN | 106286706 A | 1/2017 |
| CN | 207004939 U | 2/2018 |
| CN | 111795010 A | 10/2020 |
| DE | 10330076 A | 1/2005 |

OTHER PUBLICATIONS

Written Opinion of International Searching Authority of corresponding PCT application PCT/CN2021/071243, dated Mar. 18, 2021, 10 pages.

First Office Action of corresponding CN application CN202010653101.4, dated Apr. 6, 2021, 14 pages.

* cited by examiner

CEILING FAN MODULE WITH ENERGY DISSIPATION FUNCTION AND CONFIGURATION METHOD THEREOF

This application claims priority to Chinese Patent Application No. 202010653101.4, filed Jul. 8, 2020 in China National Intellectual Property Administration and entitled "Ceiling Fan Module with Energy Dissipation Function and Configuration Method thereof", which is hereby incorporated by reference in its entirety.

FIELD

The present disclosure relates to the field of computers, in particular to a ceiling fan module with an energy dissipation function and a configuration method thereof.

BACKGROUND

In order to increase the flow rate of system fans, a server in a data center often uses multiple fans arranged side by side to extract air. When the fan is operated, energy is gathered at a certain specific frequency. And if the energy of this frequency has definite influence on a hard disk, there will be obvious interference to a read/write head of the hard disk, resulting in a decrease in a read/write speed value of the hard disk. Generally, a delivery requirement for servers is to ensure that the hard disks will not be attenuated too much at any rotating speed to avoid the problem of unstable use or data loss and the like.

In the prior art, a rubber pad is used to support a system fan and expected to hang up the fan to a height where no energy can be transmitted. The vibration isolation effect of the rubber pad is definitely related to its own appearance size, the hardness of rubber, the assembly accuracy, vibration characteristics of the fan, and the like. Since the energy isolation effect has a clear relationship with a rubber pad process, the vibration isolation effect of the system fan is often poor, and vibration waves cannot be isolated in the rubber pad at an energy excitation end.

Therefore, in view of the current situation that the vibration isolation effect of the fan is poor in the above-mentioned prior art, developing a ceiling fan module with an energy dissipation function is a problem urgently needing to be solved.

SUMMARY

In order to overcome the deficiencies in the prior art, the present disclosure provides a ceiling fan module with an energy dissipation function, so as to solve the problem of poor vibration isolation effect of the fan in current servers.

The technical solution adopted by the present disclosure to solve the above technical problems is as follows: A ceiling fan module with an energy dissipation function includes a fan rack, a fan and an energy dissipation assembly. The energy dissipation assembly passes through the fan rack and the fan and connects the fan rack and the fan; the energy dissipation assembly includes steel cables, high-damping vibration attenuation rings, fasteners and balancing weights; two high-damping vibration attenuation rings are sleeved on one steel cable, and the two high-damping vibration attenuation rings are respectively located at two ends of the steel cable; the high-damping vibration attenuation rings are mounted on the fan rack and the fan and separate the fan rack from the fan; the fasteners are mounted on the steel cables and are located on outer sides of the high-damping vibration attenuation rings and the fan rack; the lengths of the steel cables can be changed by spinning the fasteners at one end, so as to change the rigidity of the steel cables; and the balancing weights are mounted at end part positions of the steel cables. The fan and the fan rack are connected from the upper part through the energy dissipation assembly, whereby the height of the heat dissipation fan can be increased, and vibration energy transmitted by a bottom contact system can be reduced. The high-damping vibration attenuation rings separate the fan from the fan rack to prevent the fan from directly contacting the fan rack. Furthermore, the high-damping vibration attenuation rings can absorb vibration generated by the heat dissipation fan to avoid a hard disk to be tested from absorbing excessive vibration energy. The fasteners are used to achieve adjustment of the tightness of the steel cables, thus adjusting a rigidity coefficient of the steel cables to absorb the vibration energy of a special frequency band, thus achieving accurate energy dissipation. The balancing weights are connected to a main system to achieve the objective of dual-system oscillation and the objective of dispersing energy of the vibration of the main system; a vibration value gathered at a specific frequency is dispersed into several vibration frequencies with different sizes, thus achieving the effects of buffering and suppressing the vibration and optimizing the energy dissipation result.

Further, run-through steel cable holes are formed in middle positions of the high-damping vibration attenuation rings, which are used for allowing the steel cables to pass through and are connected to the steel cables.

Further, trenches are formed in side walls of the high-damping vibration attenuation rings, and the trenches are communicated with the steel cable holes. By means of the trenches, it is convenient to quickly mount each high-damping vibration attenuation ring at a certain position of each steel cable, so as to facilitate the assembling.

Further, each of the high-damping vibration attenuation rings is provided with two annular slots, respectively a fan mounting slot and a fan rack mounting slot; the fan rack mounting slot is located on an outer side of the fan mounting slot; a barrier part is provided between the fan mounting slot and the fan rack mounting slot; and the barrier part is higher than the fan mounting slot and the fan rack mounting slot. The objective of connecting the fan and the fan rack and separating the fan from the fan rack and the objective of positioning are achieved.

Further, each high-damping vibration attenuation ring is elastic; a front end part of the high-damping vibration attenuation ring is provided with a first stop part; a rear end part of the high-damping vibration attenuation ring is provided with a second stop part; the first stop part is of a circular truncated cone-shaped structure with a thin front part and a thick rear part; the first stop part is provided with a mounting-facilitating groove; the fan mounting slot is located between the first stop part and the barrier part; the rear part of the first stop part is higher than the fan mounting slot; the fan rack mounting slot is located between the barrier part and the second stop part; and the second stop part is higher than the fan rack mounting slot. The first stop part is configured to be the circular truncated cone-shaped structure, whereby the high-damping vibration attenuation ring can pass through a mounting hole of the fan by its elasticity to achieve a tool-free fast mounting function. The objective of resistive positioning is achieved by the stop part and the barrier part.

Further, the fan rack has two side plates; the fan is mounted between the two side plates; an upper part of the fan is provided with vibration attenuation ring mounting holes; vibration attenuation ring mounting slots are formed in positions corresponding to the vibration attenuation ring mounting holes at upper parts of the side plates; the high-damping vibration attenuation rings are mounted through cooperation between the fan mounting slots and the vibration attenuation ring mounting holes in the fan; and the high-damping vibration attenuation rings are mounted through cooperation between the fan mounting slots and the vibration attenuation ring mounting slots in the fan rack, thus achieving a positioning function and facilitating the mounting.

Further, two ends of each steel cable are provided with threads; the fasteners are fixed screw nuts; the fixed screw nuts are in threaded connection with the steel cables; the fixed screw nut at one end has a middle through hole; and the steel cable passes through the middle through hole and is in threaded connection with the fixed screw nut through the middle through hole. In this way, the steel cable can be stretched by screwing in the screw nut to change the rigidity of the steel cable.

Further, a plurality of the fans is provided, each of the fans is provided with two energy dissipation assemblies.

In addition, the present disclosure further provides a configuration method for the above-mentioned ceiling fan module with an energy dissipation function, including the following steps:

A1: sleeving one high-damping vibration attenuation ring at one end of each steel cable;

A2: mounting the high-damping vibration attenuation ring at the end on one side of the fan, snapping the same into the corresponding side plate of the fan rack, and tightening the end with the fixed screw nut;

A3: sleeving another high-damping vibration attenuation ring at the other end of the steel cable;

A4: mounting the high-damping vibration attenuation ring at the other end on the other side of the fan, and snapping the same into the other side plate of the fan rack;

A5: mounting the fixed screw nut with the middle through hole at the end; and

A6: then mounting the balancing weight at the end, and disposing the balancing weight on the outer side of the fixed screw nut on the steel cable.

Further, the configuration method further includes the following parameters and calculation manner $$\begin{cases} m_1\ddot{x}_1 + c_1\dot{x}_1 + k_1x = f(t) \\ m_2\ddot{x}_2 + c_2\dot{x}_2 + k_2x_2 = 0 \end{cases}$$

wherein m represents a mass; c represents a damping coefficient; k represents a rigidity coefficient of the steel cable; $f(t)$ is a mathematical function that describes the vibration of the fan; and the vibration characteristic of the fan is described by setting a related parameter x.

In one structural system, if an excitation frequency of an external force is close to the natural frequency of the external force, an extremely large vibration magnitude will be generated. In order to reduce the vibration magnitude, the mass (m), the damping coefficient (c) or the rigidity coefficient (k) of the system can be changed.

When the mass and the stiffness of the steel cable cannot be changed, a spring and a mass block, that is, so-called vibration attenuators, can be added on two sides of the system to reduce the vibration magnitude, and an equation of motion of the vibration attenuator is a two-degree-of-freedom system, which is expressed as:

$$f(t) = \frac{a_0}{2} + \sum_{n=0}^{\infty}(a_n(t)\cos(n\omega t) + b_n(t)\sin(n\omega t))$$

wherein m1 is the mass of the fan; m2 is the mass of the balancing weight; c1 and c2 are the damping coefficients provided by the high-damping vibration attenuation rings; k1 and k2 are the rigidity coefficients of both ends of the steel cable; and $f(t)$ is a mathematical function that describes the vibration of the fan. The vibration characteristic of the fan is described by configuring a0, an, bn, and the like.

Setting is performed according to specific parameters and calculation results.

It can be seen from the above technical solution that the present disclosure has the following advantages.

This solution provides a ceiling fan module with an energy dissipation function. The vibration energy of a special frequency band is absorbed by adjusting the tightness of the steel cable, so as to achieve accurate energy dissipation. By adjusting the sizes of the balancing weights, the vibration suppressing effect is adjusted, and the energy dissipation result is optimized. The ceiling fan module is modularizable and tool-free, and has the characteristic of being easy to remove and replace. The material and labor costs for pasting a vibration attenuation material can be saved. The influence on the efficiency of a hard disk is reduced. A distance between the heat dissipation fan and a back plate of the hard disk can be shortened, and the design flexibility can be improved. This design can be applied to different types of fans, particularly, heavier fans.

BRIEF DESCRIPTION OF THE DRAWINGS

In order to explain the technical solutions of the embodiments of the present disclosure more clearly, the following will briefly introduce the accompanying drawings used in the description. Apparently, the drawings in the following description are only some embodiments of the present disclosure. Those ordinarily skilled in the art can obtain other drawings based on these drawings without creative work.

Figure 1:
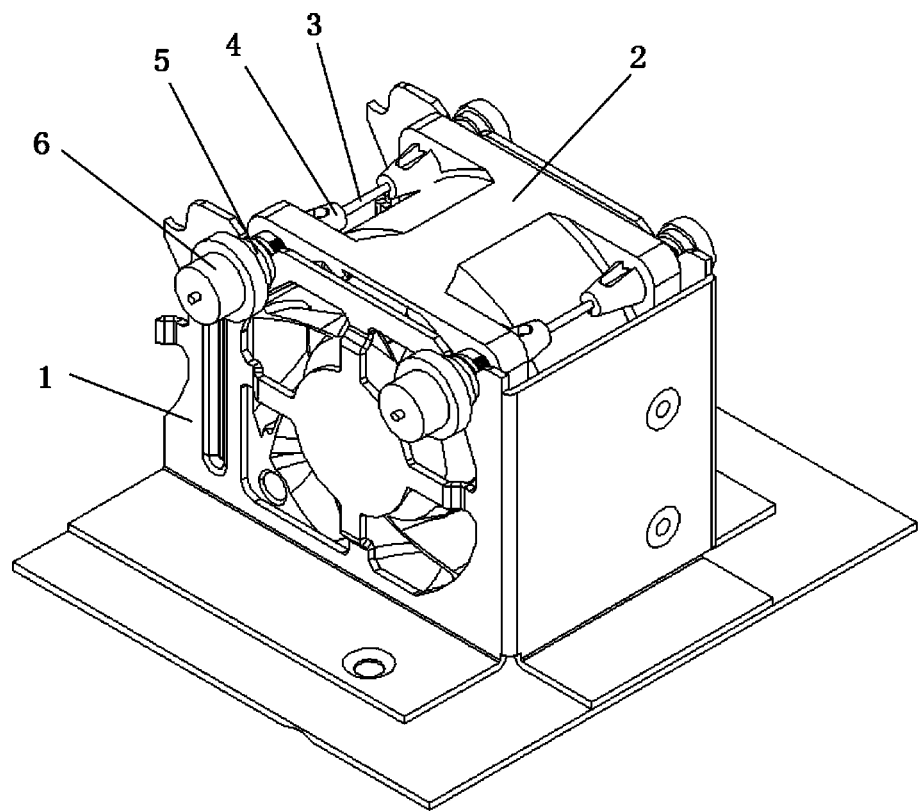
FIG. 1 is a schematic structural diagram of specific implementation 1 of the present disclosure.
Figure 2:
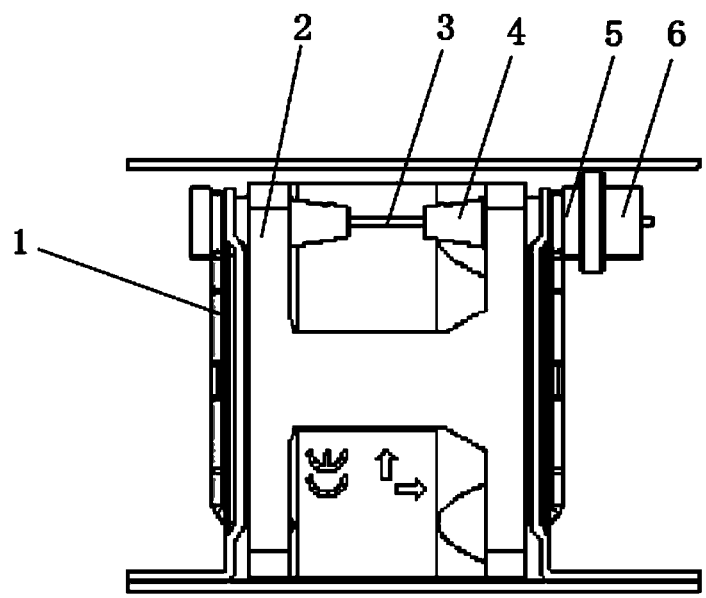
FIG. 2 is a left view of specific implementation 1 of the present disclosure.
Figure 3:
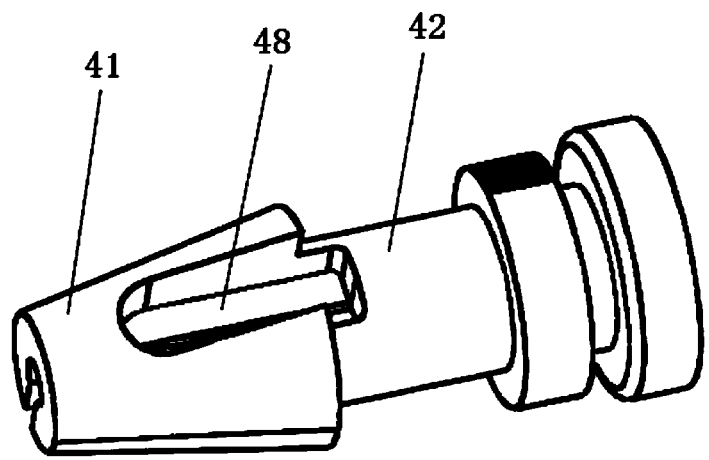
FIG. 3 is a side view of a high-damping vibration attenuation ring in specific implementation 1 of the present disclosure.
Figure 4:
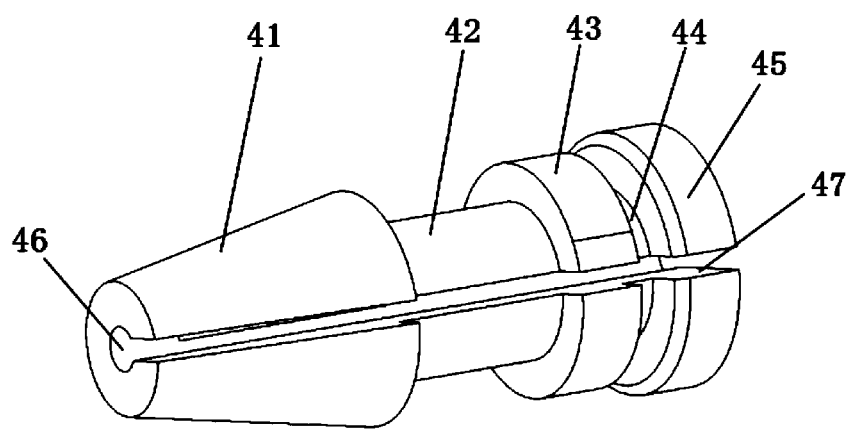
FIG. 4 is a side view of another angle of a high-damping vibration attenuation ring in specific implementation 1 of the present disclosure.
Figure 5:
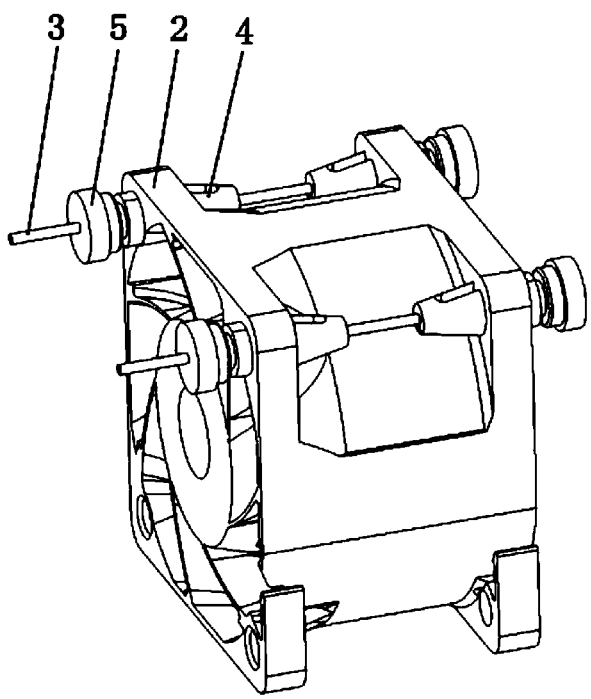
FIG. 5 is a schematic structural diagram without a balancing weight and a fan rack in FIG. 1.
Figure 6:
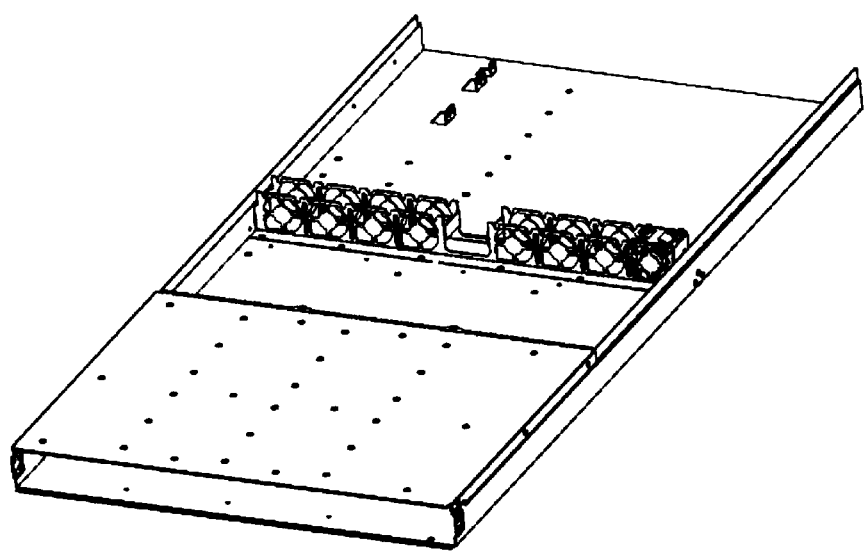
FIG. 6 is a schematic structural diagram after specific implementation 1 of the present disclosure is mounted with a hard disk.

In the drawings, 1: fan rack; 2: fan; 3: steel cable; 4: high-damping vibration attenuation ring; 5: fastener; 6: balancing weight; 41: first stop part; 42: fan mounting slot;

43: barrier part; 44: fan rack mounting slot; 45: second stop part; 46: steel cable hole; 47: trench; and 48: mounting-facilitating groove.

DETAILED DESCRIPTION

In order to make the objectives, features and advantages of the present disclosure clearer, the technical solutions in the present disclosure will be described clearly and completely below in combination with the drawings in the specific embodiments. Obviously, the embodiments described below are only part of the embodiments of the present disclosure, not all the embodiments. Based on the embodiments in the present patent, all other embodiments obtained by those ordinarily skilled in the art without doing creative work shall fall within the protection scope of the present patent.

Specific Implementation 1

As shown in FIG. 1 to FIG. 6, the present disclosure provides a ceiling fan 2 module with an energy dissipation function, mainly including a fan rack 1, a fan 2 and an energy dissipation assembly. A plurality of the fans 2 is provided, and each fan 2 is provided with two energy dissipation assemblies. The plurality of fans 2 are mounted on the fan rack 1 to form one row. The energy dissipation assemblies pass through the fan rack 1 and the fans 2 and connects the fan rack to the fans; the energy dissipation assemblies include steel cables 3, high-damping vibration attenuation rings 4, fasteners 5 and balancing weights 6; two high-damping vibration attenuation rings 4 are sleeved on one steel cable 3, and the two high-damping vibration attenuation rings 4 are respectively located at two ends of the steel cable 3; the high-damping vibration attenuation rings 4 are mounted on the fan rack 1 and the fans 2 and separate the fan rack from the fans; and the fasteners 5 are mounted on the steel cables 3 and are located on outer sides of the high-damping vibration attenuation rings 4 and the fan rack 1. In this specific implementation, the lengths of the steel cables (3) can be changed by spinning the fasteners (5) at one end, so as to change the rigidity of the steel cables; and the balancing weights (6) are mounted at end part positions of the steel cables (3).

Run-through steel cable holes 46 are formed in middle positions of the high-damping vibration attenuation rings 4, are used for allowing the steel cables 3 to pass through and are connected to the steel cables 3. Trenches 47 are also formed in side walls of the high-damping vibration attenuation rings 4, and the trenches 47 are communicated with the steel cable holes 46. By means of the trench 47, it is convenient to quickly mount each high-damping vibration attenuation ring 4 at a certain position of each steel cable 3. In addition, each of the high-damping vibration attenuation rings 4 is provided with two annular slots, respectively a fan mounting slot 42 and a fan rack mounting slot 44; the fan rack mounting slot 44 is located on an outer side of the fan mounting slot 42; a barrier part 43 is provided between the fan mounting slot 42 and the fan rack mounting slot 44; and the barrier part 43 is higher than the fan mounting slot 42 and the fan rack mounting slot 44. Each high-damping vibration attenuation ring 4 is elastic; a front end part of the high-damping vibration attenuation ring 4 is provided with a first stop part 41; a rear end part of the high-damping vibration attenuation ring 4 is provided with a second stop part 45; the first stop part 41 is of a circular truncated cone-shaped structure with a thin front part and a thick rear part; the first stop part 41 is provided with a mounting-facilitating groove 48; the fan mounting slot 42 is located between the first stop part 41 and the barrier part 43; the rear part of the first stop part 41 is higher than the fan mounting slot 42; the fan rack mounting slot 44 is located between the barrier part 43 and the second stop part 45; and the second stop part 45 is higher than the fan rack mounting slot 44. The first stop part 41 is configured to be the circular truncated cone-shaped structure, whereby the high-damping vibration attenuation ring can pass through a mounting hole of the fan 2 by its elasticity to achieve a tool-free fast mounting function. The objective of resistive positioning is achieved by the stop part and the barrier part 43.

The fan rack 1 has two side plates; the fan 2 is mounted between the two side plates; an upper part of the fan 2 is provided with vibration attenuation ring mounting holes; vibration attenuation ring mounting slots are formed in positions, corresponding to the vibration attenuation ring mounting holes, at upper parts of the side plates; the high-damping vibration attenuation rings 4 are mounted through cooperation between the fan mounting slots 42 and the vibration attenuation ring mounting holes in the fan 2; and the high-damping vibration attenuation rings 4 are mounted through cooperation between the fan rack mounting slots 44 and the vibration attenuation ring mounting slots in the fan rack 1, thus achieving a positioning function and facilitating the mounting.

In addition, two ends of each steel cable 3 are provided with threads; the fasteners are fixed screw nuts; the fixed screw nuts are in threaded connection with the steel cables 3; the fixed screw nut at one end has a middle through hole; and the steel cable 3 passes through the middle through hole and is in threaded connection with the fixed screw nut through the middle through hole, thus achieving that the steel cable 3 is stretched by screwing in the screw nut to change the rigidity of the steel cable 3.

According to the fan 2 module, the fan 2 and the fan rack 1 are connected from the upper part through the energy dissipation assemblies, whereby the height of the heat dissipation fan 2 can be increased, and vibration energy transmitted by a bottom contact system can be reduced. The high-damping vibration attenuation rings 4 separate the fan 2 from the fan rack 1 to prevent the fan 2 from directly contacting the fan rack 1. Furthermore, the high-damping vibration attenuation rings 4 can absorb vibration generated by the heat dissipation fan 2 to avoid a hard disk to be tested from absorbing excessive vibration energy. The fasteners 5 are used to achieve adjustment of the tightness of the steel cables 3, thus adjusting a rigidity coefficient of the steel cables 3 to absorb the vibration energy of a special frequency band, thus achieving accurate energy dissipation. The balancing weights 6 are connected to a main system to achieve the objective of dual-system oscillation and the objective of dispersing energy of the vibration of the main system; a vibration value gathered at a specific frequency is dispersed into several vibration frequencies with different sizes, thus achieving the effects of buffering and suppressing the vibration and optimizing the energy dissipation result.

Specific Implementation 2

This specific implementation provides a configuration method for the ceiling fan 2 with an energy dissipation function in specific implementation 1, mainly including the following steps:

A1: sleeving one high-damping vibration attenuation ring 4 at a right end of each steel cable 3;

A2: mounting the high-damping vibration attenuation ring 4 at the end on one side of the fan 2, snapping the same into the corresponding side plate of the fan rack 1, and tightening the end with the fixed screw nut;

A3: sleeving another high-damping vibration attenuation ring 4 at a left end of each steel cable 3;

A4: mounting the high-damping vibration attenuation ring 4 at the left end on the other side of the fan 2, and snapping the same into the other side plate of the fan rack 1;

A5: mounting the fixed screw nut with the middle through hole at the left end, and screwing in or screwing out the fixed screw nut to change a length of the steel cable 3 to satisfy desired rigidity; and A6: then mounting the balancing weight 6 at the left end, and disposing the balancing weight 6 on the outer side of the fixed screw nut on the steel cable 3.

Further, the configuration method further includes the following parameters and calculation manner $$\begin{cases} m_1\ddot{x}_1 + c_1\dot{x}_1 + k_1 x = f(t) \\ m_2\ddot{x}_2 + c_2\dot{x}_2 + k_2 x_2 = 0 \end{cases}$$

wherein m represents a mass; c represents a damping coefficient; k represents a rigidity coefficient of the steel cable 3; ƒ(t) is a mathematical function that describes the vibration of the fan 2; and the vibration characteristic of the fan 2 is described by setting a related parameter x.

In one structural system, if an excitation frequency of an external force is close to the natural frequency of the external force, an extremely large vibration magnitude will be generated. In order to reduce the vibration magnitude, the mass (m), the damping coefficient (c) or the rigidity coefficient (k) of the system can be changed.

Figure 7:
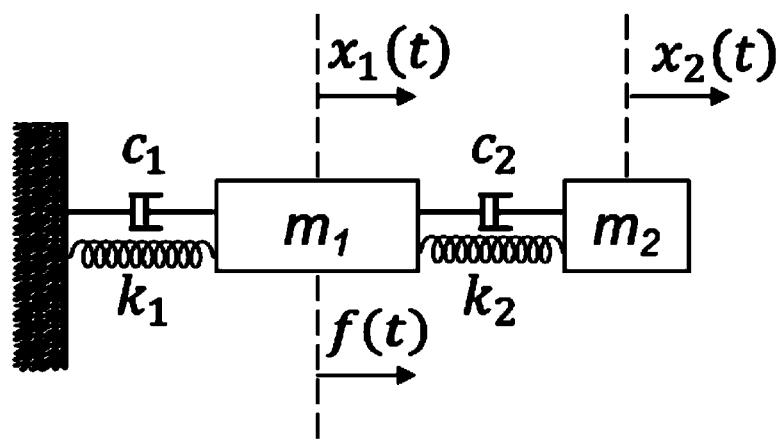
FIG. 7 is a schematic diagram of an operation manner of a vibration attenuator in specific implementation 2 of the present disclosure.

When the mass and the rigidity of the steel cable cannot be changed, a spring and a mass block, that is, so-called vibration attenuators, can be added on two sides of the system to reduce the vibration magnitude. As shown in FIG. 7, an equation of motion of the vibration attenuator is a two-degree-of-freedom system, which is expressed as:

$$f(t) = \frac{a_0}{2} + \sum_{n=0}^{\infty}(a_n(t)\cos(n\omega t) + b_n(t)\sin(n\omega t))$$

wherein m1 is the mass of the fan; m2 is the mass of the balancing weight; c1 and c2 are the damping coefficients provided by the high-damping vibration attenuation rings; k1 and k2 are the rigidity coefficients of the steel cable; and ƒ(t) is a mathematical function that describes the vibration of the fan. The vibration characteristic of the fan is described by configuring a0, an, bn, and the like.

Setting is performed according to specific parameters and calculation results.

The terms "upper", "lower", "outer side", "inner side", etc. (if any) in the description and claims of the present disclosure and the above drawings are used to distinguish the relative relationships in positions and are not necessarily qualitative.

It should be understood that data used in this way is interchangeable under appropriate circumstances so that the embodiments of the present disclosure described herein can be implemented in an order other than those illustrated or described herein. In addition, the terms "include" and "has" and any variations of them are intended to cover non-exclusive inclusions.

The foregoing description of the disclosed embodiments enables those skilled in the art to implement or use the present disclosure. Various modifications to these embodiments will be obvious to those skilled in the art, and the general principles defined herein can be implemented in other embodiments without departing from the spirit or scope of the present disclosure. Therefore, the present disclosure will not be limited to these embodiments shown in this text, but should conform to the widest scope consistent with the principles and novel features disclosed herein.

What is claimed is:

1. A ceiling fan module with an energy dissipation function, comprising a fan rack, a fan and an energy dissipation assembly, wherein the energy dissipation assembly passes through the fan rack and the fan and connects the fan rack and the fan; the energy dissipation assembly comprises a steel cable, damping vibration attenuation rings, fasteners and a balancing weight; two of the damping vibration attenuation rings are sleeved on the steel cable, and the two of the damping vibration attenuation rings are respectively located at two ends of the steel cable; the damping vibration attenuation rings are mounted on the fan rack and the fan and separate the fan rack from the fan; the fasteners are mounted at the two ends of the steel cable and are located on outer sides of the damping vibration attenuation rings and the fan rack; a rigidity of the steel cable is changed by spinning the fasteners at one end; and the balancing weight is mounted at end part positions of the steel cable.

2. The ceiling fan module with the energy dissipation function according to claim 1, wherein run-through steel cable holes are formed in middle positions of the damping vibration attenuation rings.

3. The ceiling fan module with the energy dissipation function according to claim 2, wherein a trench is formed in a side wall of each of the damping vibration attenuation rings, and the trench is in communication with the run-through steel cable holes.

4. The ceiling fan module with the energy dissipation function according to claim 3, wherein each of the damping vibration attenuation rings is provided with two annular slots, respectively a fan mounting slot and a fan rack mounting slot; the fan rack mounting slot is located on an outer side of the fan mounting slot; a barrier part is provided between the fan mounting slot and the fan rack mounting slot; and the barrier part is higher than the fan mounting slot-and the fan rack mounting slot.

5. The ceiling fan module with the energy dissipation function according to claim 4, wherein each of the damping vibration attenuation rings is elastic; a front end part of each of the damping vibration attenuation rings is provided with a first stop part; a rear end part of each of the damping vibration attenuation rings is provided with a second stop part; the first stop part is provided with a mounting-facilitating groove; the fan mounting slot is located between the first stop part and the barrier part; a rear part of the first stop part is higher than the fan mounting slot; the fan rack mounting slot is located between the barrier part and the second stop part; and the second stop part is higher than the fan rack mounting slot.

6. The ceiling fan module with the energy dissipation function according to claim 5, wherein the fan rack has two side plates; the fan is mounted between the two side plates; an upper part of the fan is provided with vibration attenuation ring mounting holes; vibration attenuation ring mounting slots are formed in positions, corresponding to the vibration attenuation ring mounting holes, at upper parts of the two side plates; the damping vibration attenuation rings are mounted through cooperation between the fan mounting slots and the vibration attenuation ring mounting holes in the fan; and the damping vibration attenuation rings are mounted through cooperation between the fan rack mounting slots and the vibration attenuation ring mounting slots in the fan rack.

7. The ceiling fan module with the energy dissipation function according to claim 1, wherein the two ends of the steel cable is provided with threads; the fasteners are fixed screw nuts; the fixed screw nuts are in threaded connection with the steel cable; a first fixed screw nut of the fixed screw nuts at one end has a middle through hole; and the steel cable passes through the middle through hole and is in threaded connection with the first fixed screw nut through the middle through hole.

8. The ceiling fan module with the energy dissipation function according to claim 1, wherein a plurality of fans comprising the fan are provided, and two energy dissipation assemblies comprising the energy dissipation assembly are provided to each of the plurality of fans.

9. The ceiling fan module with the energy dissipation function according to claim 5, wherein the first stop part is of a circular truncated cone-shaped structure with a thin front part and a thick rear part.

10. A configuration method for the ceiling fan module with an energy dissipation function according to claim 1, comprising the following steps:
   A1: sleeving a first damping vibration attenuation ring of the damping vibration attenuation rings at a first end of the steel cable;
   A2: mounting the first damping vibration attenuation ring at the first end on a first side of the fan, snapping the same into a first side plate of the fan rack, and tightening the first end with a first fixed screw nut;
   A3: sleeving a second damping vibration attenuation ring of the damping vibration attenuation rings at a second end of the steel cable;
   A4: mounting the second damping vibration attenuation ring at the second end on a second side of the fan, and snapping the same into a second side plate of the fan rack;
   A5: mounting a second fixed screw nut with a middle through hole at the second end; and
   A6: then mounting the balancing weight at the second end, and disposing the balancing weight on an outer side of the second fixed screw nut on the steel cable.

11. The ceiling fan module with the energy dissipation function according to claim 2, wherein the two ends of the steel cable are provided with threads; the fasteners are fixed screw nuts; the fixed screw nuts are in threaded connection with the steel cable; a first fixed screw nut of the fixed screw nuts at one end has a middle through hole; and the steel cable passes through the middle through hole and is in threaded connection with the first fixed screw nut through the middle through hole.

12. The ceiling fan module with the energy dissipation function according to claim 3, wherein the two ends of the steel cable are provided with threads; the fasteners are fixed screw nuts; the fixed screw nuts are in threaded connection with the steel cable; a first fixed screw nut of the fixed screw nuts at one end has a middle through hole; and the steel cable passes through the middle through hole and is in threaded connection with the first fixed screw nut through the middle through hole.

13. The ceiling fan module with the energy dissipation function according to claim 6, wherein the two ends of the steel cable are provided with threads; the fasteners are fixed screw nuts; the fixed screw nuts are in threaded connection with the steel cable; a first fixed screw nut of the fixed screw nuts at one end has a middle through hole; and the steel cable passes through the middle through hole and is in threaded connection with the fixed screw nut through the middle through hole.

14. The ceiling fan module with the energy dissipation function according to claim 4, wherein the two ends of the steel cable are provided with threads; the fasteners are fixed screw nuts; the fixed screw nuts are in threaded connection with the steel cable; a first fixed screw nut of the fixed screw nuts at one end has a middle through hole; and the steel cable passes through the middle through hole and is in threaded connection with the first fixed screw nut through the middle through hole.

15. The ceiling fan module with the energy dissipation function according to claim 5, wherein the two ends of the steel cable are provided with threads; the fasteners are fixed screw nuts; the fixed screw nuts are in threaded connection with the steel cable; a first fixed screw nut of the fixed screw nuts at one end has a middle through hole; and the steel cable passes through the middle through hole and is in threaded connection with the first fixed screw nut through the middle through hole.

16. The ceiling fan module with the energy dissipation function according to claim 2, wherein a plurality of fans comprising the fan are provided, and two energy dissipation assemblies comprising the energy dissipation assembly are provided to each of the plurality of fans.

17. The ceiling fan module with the energy dissipation function according to claim 3, wherein a plurality of fans comprising the fan are provided, and two energy dissipation assemblies comprising the energy dissipation assembly are provided to each of the plurality of fans.

18. The ceiling fan module with the energy dissipation function according to claim 4, wherein a plurality of fans comprising the fan are provided, and two energy dissipation assemblies comprising the energy dissipation assembly are provided to each of the plurality of fans.

19. The ceiling fan module with the energy dissipation function according to claim 6, wherein a plurality of fans comprising the fan are provided, and two energy dissipation assemblies comprising the energy dissipation assembly are provided to each of the plurality of fans.

20. The ceiling fan module with the energy dissipation function according to claim 5, wherein a plurality of fans comprising the fan are provided, and two energy dissipation assemblies comprising the energy dissipation assembly are provided to each of the plurality of fans.

\* \* \* \* \*